(12) United States Patent
Tanaka et al.

(10) Patent No.: US 10,706,279 B2
(45) Date of Patent: Jul. 7, 2020

(54) CONTENT VERIFICATION APPARATUS, METHOD FOR VERIFYING CONTENT, AND NON-TRANSITORY COMPUTER-READABLE STORAGE MEDIUM

(71) Applicant: FUJITSU LIMITED, Kawasaki-shi, Kanagawa (JP)

(72) Inventors: Hiroshi Tanaka, Ota (JP); Eigo Segawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 129 days.

(21) Appl. No.: 16/049,758

(22) Filed: Jul. 30, 2018

(65) Prior Publication Data

US 2019/0042841 A1 Feb. 7, 2019

(30) Foreign Application Priority Data

Aug. 1, 2017 (JP) .................. 2017-149353

(51) Int. Cl.
*G06K 9/00* (2006.01)
*G06K 9/62* (2006.01)
*G06K 9/32* (2006.01)

(52) U.S. Cl.
CPC ......... *G06K 9/00483* (2013.01); *G06K 9/325* (2013.01); *G06K 9/6202* (2013.01); *G06K 9/6215* (2013.01)

(58) Field of Classification Search
CPC .... G06K 9/6202; G06K 9/6215; G06K 9/325; G06K 9/00483
See application file for complete search history.

(56) References Cited

U.S. PATENT DOCUMENTS

| 2005/0097159 | A1* | 5/2005 | Skidgel ................. G06F 16/954 709/200 |
| 2011/0093773 | A1* | 4/2011 | Yee ..................... G06F 16/9577 715/235 |
| 2013/0083996 | A1 | 4/2013 | Prasad et al. |
| 2016/0274983 | A1 | 9/2016 | Yasuda et al. |

FOREIGN PATENT DOCUMENTS

| JP | 2011-164783 A | 8/2011 |
| JP | 2013-077301 A | 4/2013 |
| JP | 2016-045545 A | 4/2016 |

OTHER PUBLICATIONS

Shauvik R. Choudhary et al., "WEBDIFF: Automated Identification of Cross-browser Issues in Web Applications", 26th IEEE International Conference on Software Maintenance in Timisoara, Romania (ICSM), Sep. 2010 (Total 10 pages).

* cited by examiner

*Primary Examiner* — Sam Bhattacharya
(74) *Attorney, Agent, or Firm* — Fujitsu Patent Center

(57) ABSTRACT

A non-transitory computer-readable storage medium having stored therein a program for verifying content, the program executing a process includes identifying, among a plurality of elements included in a content to be verified and displayed in two browsers that display the content respectively, a dynamic element whose attribute relating to display changes over time or whose element image changes over time in at least one of the two browsers; and identifying an area in which displayed content is different between the two browsers by comparing element images of the plurality of elements other than the dynamic element between the two browsers.

11 Claims, 5 Drawing Sheets

CONTENT VERIFICATION APPARATUS, METHOD FOR VERIFYING CONTENT, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-149353, filed on Aug. 1, 2017, the entire contents of which are incorporated herein by reference.

FIELD

The embodiment discussed herein is related to a content verification apparatus, a method for verifying content, and a non-transitory computer-readable storage medium for, for example, verifying content displayed in browsers.

BACKGROUND

Various pieces of information are provided through a communication network as webpages displayed in web browsers. Various application programs (hereinafter referred to as "web applications") that operate on web browsers are also provided. For such webpages and web applications (hereinafter collectively referred to as "web content"), an operation for verifying whether the web content can be normally displayed in web browsers or whether the web content normally operates is performed before the web content is provided.

A plurality of different web browsers are generally used. It is therefore preferable for web content to be displayed and operate in the same manner regardless of a web browser that has read the web content. A cross-browser test, in which web content to be verified is displayed in two different web browsers and display screens of the web browsers are compared with each other, therefore, is often conducted in order to verify web content. In the cross-browser test, images of HyperText Markup Language (HTML) elements included in web content to be verified are obtained in each browser. The images of the HTML elements are then compared between the web browsers in order to determine whether displayed content is the same between the two web browsers.

Depending on web content, however, a dynamic HTML element, whose displayed content changes over time, such as a moving image, might be included. If such a dynamic HTML element is compared between web browsers in the cross-browser test, accurate verification might not be performed since displayed content of an image to be compared differs depending on a timing at which the image is obtained. In order to address this problem, a technique for excluding, from the comparison, an area in which displayed content changes each time a webpage is read in the cross-browser test has been proposed (for example, refer to Shauvik Roy Choudhary, et al., "WebDiff: Automated Identification of Cross-browser Issues in Web Applications", Proc. of Intl. Conf. on Software Maintenance (ICSM), September 2010).

In the example of the related art, screenshots generated each time a webpage is read in web browsers are compared with each other to detect areas in which displayed content changes, and the detected areas are excluded from areas to be compared between the web browsers.

Depending on how a dynamic HTML element is described, however, two images of the dynamic HTML element obtained at different timings might include the same content. In this case, detection of areas in which the dynamic HTML is displayed can fail in the example of the related art. In view of this situation, it is desirable to improve the accuracy of comparing displayed content between different browsers.

SUMMARY

According to an aspect of the invention, a non-transitory computer-readable storage medium having stored therein a program for verifying content, the program executing a process includes identifying, among a plurality of elements included in a content to be verified and displayed in two browsers that display the content, a dynamic element whose attribute relating to display changes over time or whose element image changes over time in at least one of the two browsers; and identifying an area in which displayed content is different between the two browsers by comparing element images of the plurality of elements other than the dynamic element between the two browsers.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A content verification apparatus, a method for verifying content used by the content verification apparatus, and a computer program for verifying content will be described hereinafter with reference to the drawings. The content verification apparatus is used, for example, to conduct a cross-browser test. For this purpose, the content verification apparatus extracts HTML elements displayed in two web browsers that have read the same web content. The content verification apparatus then compares, between the web browsers, images of the extracted HTML elements. At this time, the content verification apparatus excludes an area in which a dynamic HTML element is displayed (hereinafter referred to as a "dynamic area") from the comparison between the web browsers. In the following description, a browser that displays web content to be verified will be simply referred to as a "browser" for convenience of description. An HTML element is an example of an element displayed in a browser.

In order to accurately extract a dynamic area, the present inventor has taken into consideration that even a dynamic area can display the same content at different timings.

Figure 1A:
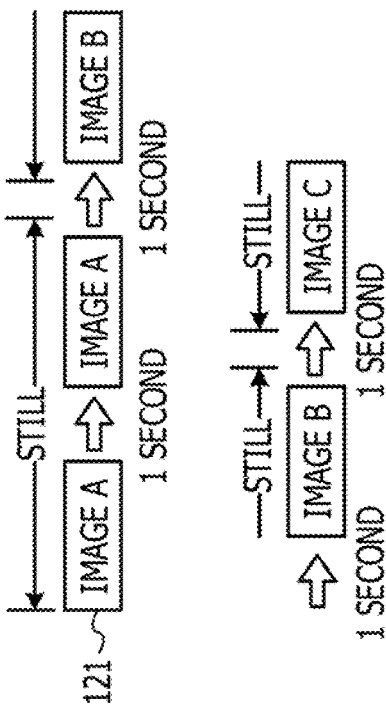
FIGS. 1A, 1B and 1C are diagrams illustrating examples of a dynamic area in which the same content is displayed at different timings.
Figure 1B:
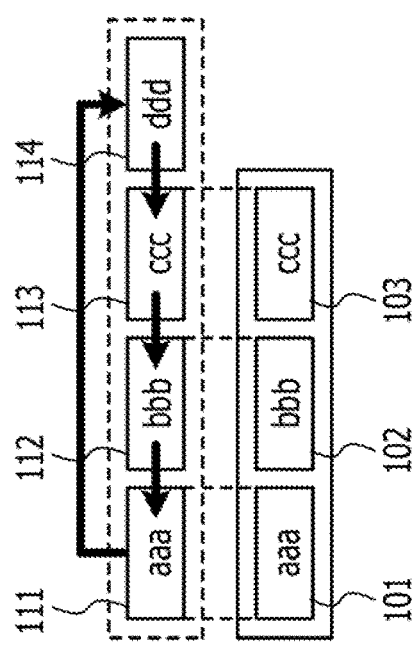
Figure 1C:
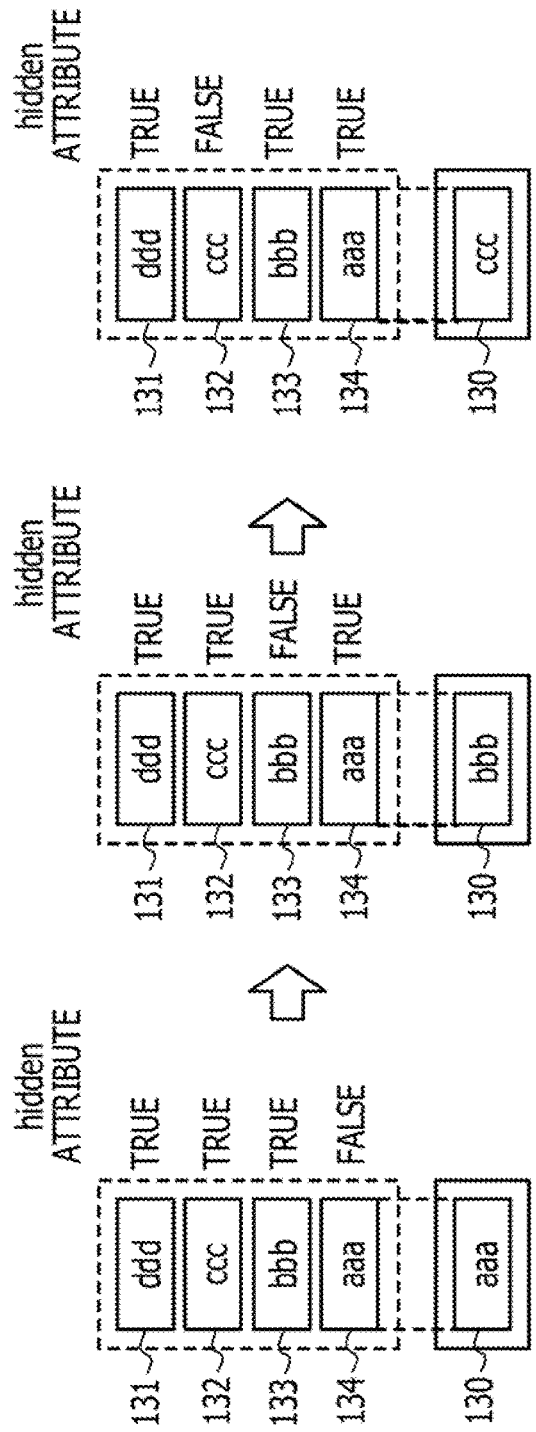

FIGS. 1A to 1C are diagrams illustrating examples of a dynamic area in which the same content is displayed at different timings.

In the example illustrated in FIG. 1A, three frames 101 to 103 are provided in a browser, and three out of four HTML elements 111 to 114 are displayed in the frames 101 to 103, respectively. The four HTML elements 111 to 114 move over time as indicated by arrows illustrated in FIG. 1A. Here, an area of a browser in which a target HTML element is displayed is identified, for example, by specifying an identification number of the target HTML element in the browser that has read web content, obtaining actual data regarding the target HTML element, and analyzing the actual data. An image of the target HTML element, therefore, is obtained by capturing an image of an area in which the identified target HTML element is displayed. For this reason, in the example illustrated in FIG. 1A, content displayed in the frames 101 to 103 dynamically changes, but images of the HTML elements 111 to 114 captured by specifying identification numbers remain the same. Even if temporal changes in displayed content of an image obtained by capturing an image of an area identified by specifying the identification numbers of the HTML elements 111 to 114 are examined, identification of a dynamic area fails.

In the example illustrated in FIG. 1B, an image displayed in the same dynamic area as an HTML element 121 changes at certain time intervals (for example, every 2 seconds). Even if two images in the dynamic area are obtained by capturing an image of the dynamic area twice at time intervals shorter than the certain time intervals, therefore, the two images are the same. As a result, identification of the dynamic area fails.

In the example illustrated in FIG. 1C, four HTML elements 131 to 134 are associated with a dynamic area 130 in a hierarchical manner. Hidden attributes are set to the HTML elements 131 to 134, and when the hidden attribute is true, the corresponding HTML element is not displayed. That is, an HTML element displayed in the dynamic area 130 changes as the hidden attributes set to the HTML elements 131 to 134 dynamically change. In a left part of FIG. 1C, for example, the hidden attribute of the HTML element 134 is false, and the hidden attributes of the other HTML elements 131 to 133 are true. As a result, the HTML element 134 is displayed in the dynamic area 130. In a central part of FIG. 1C, the hidden attribute of the HTML element 133 is false, and the hidden attributes of the other HTML elements 131, 132, and 134 are true. As a result, the HTML element 133 is displayed in the dynamic area 130. In a right part of FIG. 1C, the hidden attribute of the HTML element 132 is false, and the hidden attributes of the other HTML elements 131, 133, and 134 are true. As a result, the HTML element 132 is displayed in the dynamic area 130.

In this case, the HTML elements 131 to 134 do not change. Even if an image of the dynamic area 130 is captured a plurality of times without the hidden attributes of the HTML elements 131 to 134 being changed, therefore, the captured images of the dynamic area 130 are the same. As a result, identification of the dynamic area 130 fails.

By focusing upon attributes (for example, coordinates of a display area, changes over time, and hidden attributes) relating to display of HTML elements displayed in a dynamic area in FIGS. 1A to 1C, it can be seen that content displayed in the dynamic area changes over time.

The content verification apparatus, therefore, obtains an attribute relating to display of each of HTML elements included in web content to be verified at least twice at different timings from each of two browsers that have read web content. The content verification apparatus also obtains, at least twice at different timings, an image of an area in which each HTML element is displayed by capturing the image. The content verification apparatus then compares, for each browser and each HTML element, the attributes relating to display obtained at the different timings and the images obtained at the different timings. The content verification apparatus identifies an HTML element whose attribute relating to display changes over time or whose image changes over time and excludes an area in which the identified HTML element is displayed from comparison between the browsers. As a result, the content verification apparatus improves the accuracy of comparing displayed web content between two browsers.

In the following embodiment, content to be verified is described in HTML. Content to be verified, however, may be described in another language that can be used in browsers. In this case, an element included in content to be verified and displayed in the browsers may be an element specified in a language used to describe content.

Figure 2:
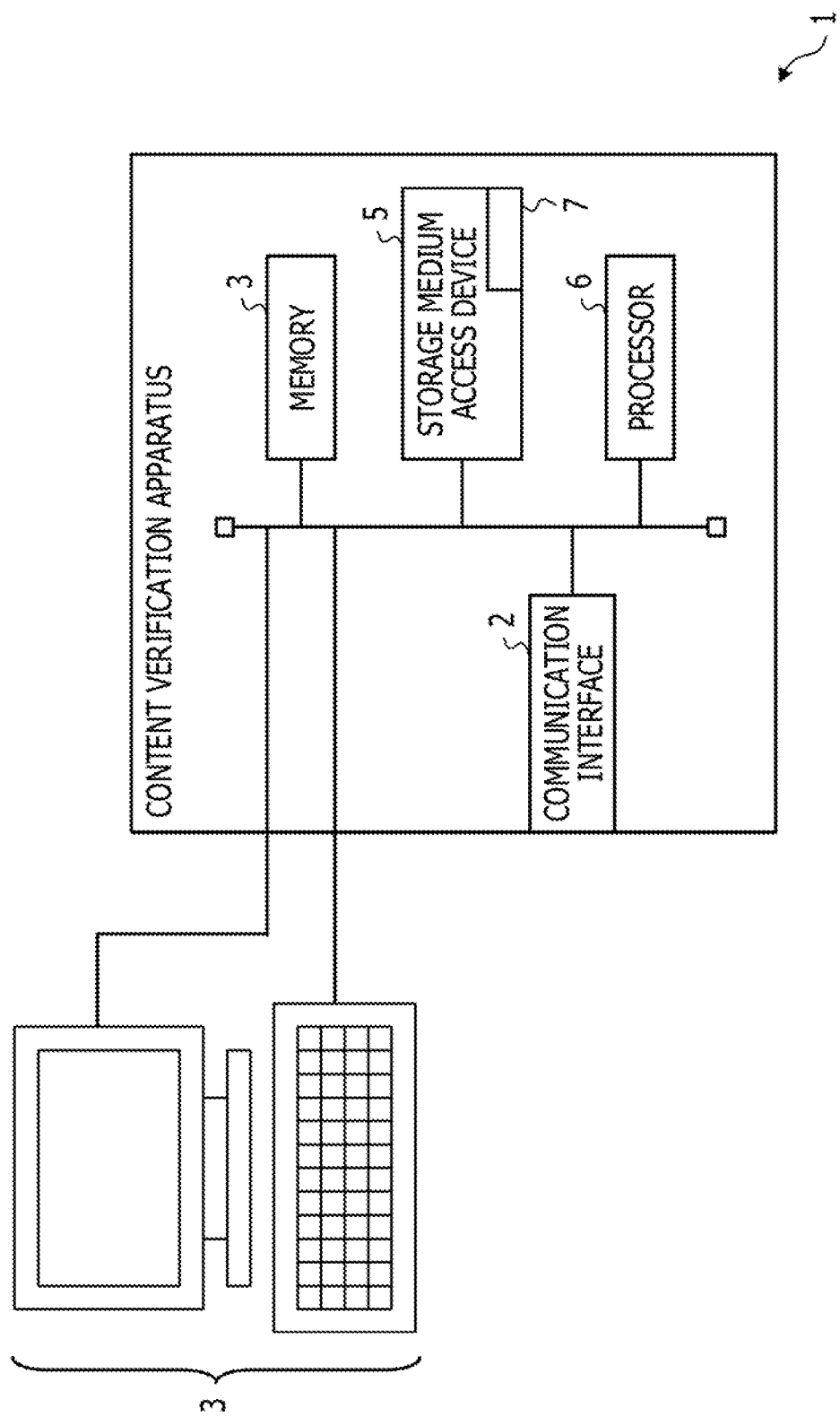
FIG. 2 is a diagram illustrating the hardware configuration of a content verification apparatus according to an embodiment.

FIG. 2 is a diagram illustrating the hardware configuration of the content verification apparatus according to the embodiment. As illustrated in FIG. 2, a content verification apparatus 1 includes a communication interface 2, a user interface 3, a memory 4, a storage medium access device 5, and a processor 6.

The communication interface 2 includes a communication interface for connecting to a communication network according to a communication standard such as Ethernet (registered trademark) and a control circuit. The communication interface 2 receives a source code of web content to be verified from another apparatus (not illustrated) through the communication network, for example, and transfers the received source code of the web content to the processor 6. The communication interface 2 may output a result of comparison of web content between browsers received from the processor 6 to another apparatus through the communication network.

The user interface 3 includes input devices such as a keyboard and a mouse and a display device such as a liquid crystal display. Alternatively, the user interface 3 may include a device in which an input device and a display device are integrated with each other, such as a touch panel. The user interface 3 then displays, on the display device, windows indicating two browsers displaying web content to be verified received from the processor 6. The user interface 3 may also display a result of comparison of the web content between the browsers received from the processor 6. A source code of the web content to be verified may be input through the user interface 3.

The memory 4 is an example of a storage unit and includes, for example, a readable/writable semiconductor memory and a read-only semiconductor memory. The memory 4 stores, for example, source codes of web content to be verified, various pieces of data used by the processor 6 to perform a process for verifying content, results of comparison, and the like. The memory 4 may also store various pieces of data for a certain period of time, such as images obtained by capturing images of HTML elements during the process for verifying content.

The storage medium access device 5 is another example of the storage unit and, for example, is a device that accesses a storage medium 7 such as a magnetic disk, a semiconductor memory card, or an optical storage medium. The storage medium access device 5 reads, from the storage medium 7, a computer program executed by the processor 6 to perform the process for verifying content and executable files and related files of two browsers used in the process for verifying content, for example, and transfers the computer program, the executable files, and the related files to the processor 6. The storage medium access device 5 may read a source code of web content to be verified and transfer the source code to the processor 6.

The processor 6 is an example of a control unit and includes, for example, a central processing unit (CPU) and peripheral circuits. The processor 6 may also include a numeric data processor. The processor 6 controls the entirety of the content verification apparatus 1. If the processor 6 receives a source code of web content to be verified through the communication interface 2, the processor 6 saves the source code to the memory 4. The processor 6 then performs the process for verifying content.

Figure 3:
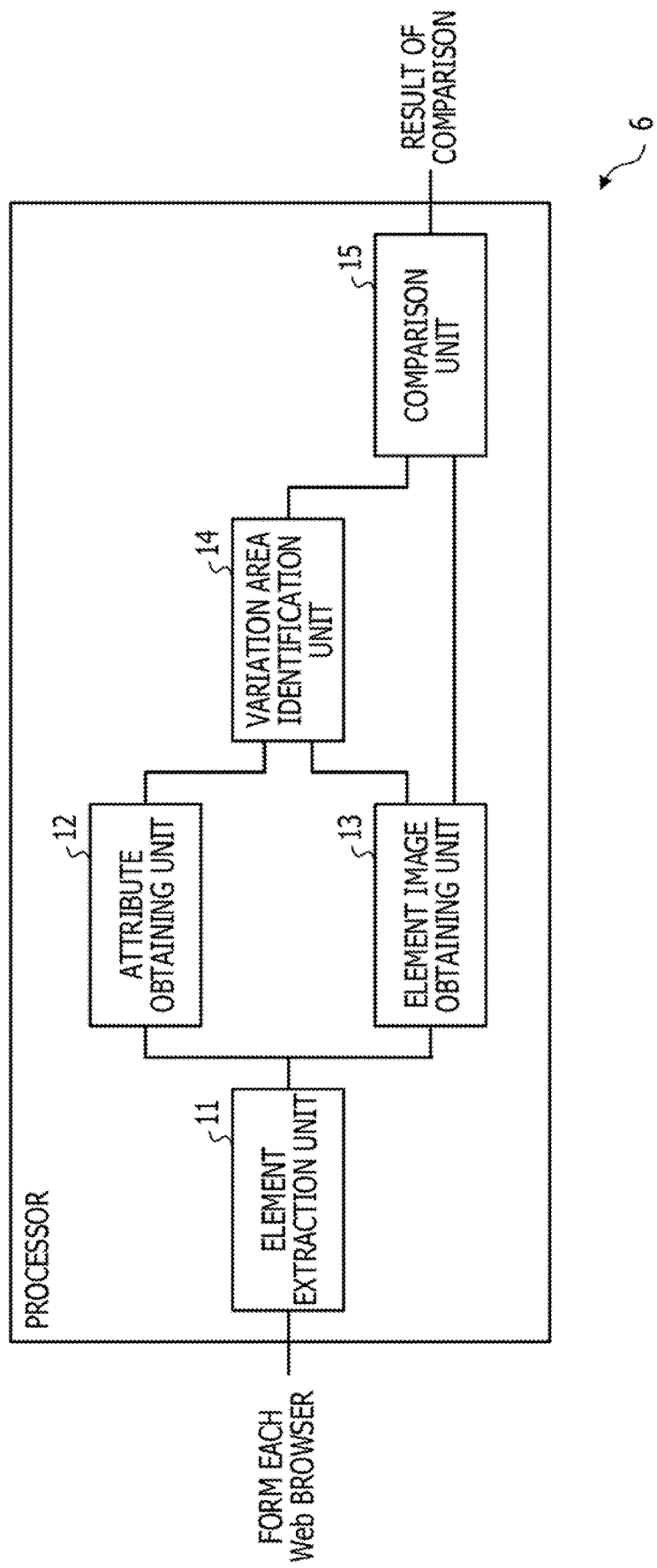
FIG. 3 is a diagram illustrating functional blocks of a processor relating to a process for verifying content.

FIG. 3 is a diagram illustrating functional blocks of the processor 6 relating to the process for verifying content. As illustrated in FIG. 3, the processor 6 includes an element extraction unit 11, an attribute obtaining unit 12, an element image obtaining unit 13, a dynamic area identification unit 14, and a comparison unit 15.

These components of the processor 6 are, for example, functional modules achieved by a computer program executed by the processor 6. Alternatively, these components of the processor 6 may be incorporated into the content verification apparatus 1 as firmware.

The processor 6 starts the process for verifying content by activating two different browsers used in the process for verifying content. The processor 6 then causes the two browsers to read a source code of web content to be verified and display the web content to be verified. At this time, it is preferable for the processor 6 to display the browsers on the user interface 3 such that the browsers do not overlap with each other.

The element extraction unit 11 extracts actual data regarding HTML elements displayed in the two browsers that display web content to be verified. The element extraction unit 11 may extract actual data regarding HTML elements using the same method as in software for analyzing browsers, such as Selenium WebDriver. The element extraction unit 11 obtains identification numbers of HTML elements, for example, from a source code of web content to be verified. The element extraction unit 11 then specifies the identification numbers of the HTML elements in the two browsers and performs the same process as GetElementByID( ) of Selenium WebDriver. As a result, the element extraction unit 11 can extract actual data regarding the HTML elements included in the web content displayed in the browsers. The element extraction unit 11 may extract actual data regarding HTML elements using one of other various techniques for extracting actual data regarding HTML elements displayed in browsers displaying web content, instead.

The element extraction unit 11 may extract two or more pieces of actual data regarding each HTML element by performing the above process in each of the two browsers twice or more at different timings. The element extraction unit 11 then transfers the two or more pieces of actual data regarding each HTML element extracted from each of the two browsers to the attribute obtaining unit 12 and the element image obtaining unit 13.

The attribute obtaining unit 12 obtains information indicating attributes relating to display of HTML elements extracted from two browsers.

For example, the attribute obtaining unit 12 extracts, from each browser, information indicating attributes relating to display by analyzing actual data regarding HTML elements received from the element extraction unit 11. Attributes relating to display at least include, for example, information indicating whether HTML elements are displayed, such as coordinates of areas in which HTML elements are displayed or hidden attributes, information indicating transparency set to HTML elements, or information indicating whether HTML elements are moving images.

In the present embodiment, actual data regarding each HTML element is extracted twice or more at different timings. The attribute obtaining unit 12, therefore, may obtain an attribute relating to display from actual data regarding each HTML element.

The attribute obtaining unit 12 transmits, to the dynamic area identification unit 14, information indicating an attribute of display of each HTML element at a time when actual data regarding the HTML element has been extracted.

The element image obtaining unit 13 obtains an image of each HTML element displayed in two browsers at least twice at different timings.

For this purpose, when actual data regarding each HTML element is extracted from a target browser, for example, the element image obtaining unit 13 obtains a screenshot of a display screen of the user interface 3 with the target browser displayed. At this time, the element image obtaining unit 13 may use a function for obtaining a screenshot, such as SaveScreenShot( ). The element image obtaining unit 13 may obtain one screenshot for a target browser each time actual data regarding all HTML elements included in web content and displayed in the target browser has been obtained.

The element image obtaining unit 13 obtains coordinates of an area in which each of HTML elements extracted from a target browser is displayed, the coordinates being included in actual data regarding the HTML element. The element image obtaining unit 13 then obtains an image of each HTML element by trimming a screenshot image down to an area defined by the coordinates obtained for the HTML element.

The element image obtaining unit 13 obtains at least two images of each HTML element for each browser by performing the above process twice or more at different timings. An image of each HTML image will be referred to as an "element image" hereinafter.

The element image obtaining unit 13 transfers element images to the dynamic area identification unit 14 and the comparison unit 15.

The dynamic area identification unit 14 identifies an HTML element whose position or content changes over time and a dynamic area in which the HTML element is displayed based on attributes relating to display of HTML elements included in web content to be verified and element images of the HTML elements in a browser. An HTML element displayed in a dynamic area will be referred to as a "dynamic element" hereinafter. The dynamic area identification unit 14 may perform the same process for each HTML element, and a process for a target HTML element will be described hereinafter.

The dynamic area identification unit 14 compares attributes relating to display of a target HTML element obtained at different timings. If the attributes relating to display are different from each other, the dynamic area identification unit 14 determines the target HTML element as a dynamic element and an area in which the target HTML element is displayed as a dynamic area.

If a position of a target HTML element changes over time as illustrated in FIG. 1A, for example, coordinates of the target HTML element changes. The dynamic area identification unit 14, therefore, determines a target HTML element as a dynamic element if coordinates of the target HTML element obtained at different timings are different from each other, and determines, as a dynamic area, an area in which the target HTML element is displayed at a time when actual data regarding the target HTML element has been extracted.

If a hidden attribute of a target HTML element changes over time as illustrated in FIG. 1C, content actually displayed in an area in which the target HTML element is displayed also changes over time. The dynamic area identification unit 14, therefore, determines a target. HTML element as a dynamic element if values of a hidden attribute of the target HTML element obtained at different timings do not match, and determines, as a dynamic area, in which the HTML element is displayed.

Furthermore, if transparency is set to a target HTML element and the transparency changes over time, content actually displayed in an area in which the target HTML element is displayed also changes over time. The dynamic area identification unit 14, therefore, determines a target HTML element as a dynamic element if values of transparency of the target HTML element obtained at different timings do not match, and determines, as a dynamic area, an area in which the target HTML element is displayed.

Furthermore, if a target HTML element includes a moving image, the dynamic area identification unit 14 determines the target HTML element as a dynamic element and an area in which the target HTML element is displayed as a dynamic area. If a tag associated with a target HTML element indicates a moving image, for example, the dynamic area identification unit 14 can determine that the target HTML element includes a moving image. A tag indicating a moving image is an example of information indicating whether a target HTML element is a moving image.

Furthermore, the dynamic area identification unit 14 compares element images of a target HTML element obtained at different timings. If the element images do not match, the dynamic area identification unit 14 determines the target HTML element as a dynamic element and an area in which the target HTML element is displayed as a dynamic area. The dynamic area identification unit 14 may, for example, calculate a normalized correlation value of element images of a target HTML element obtained at different timings. If the normalized correlation value is equal to or smaller than a certain threshold, the dynamic area identification unit 14 may determine that the element images do not match, and if the normalized correlation value is larger than the certain threshold, the dynamic area identification unit 14 may determine that the element images match. The dynamic area identification unit 14 may calculate the sum of absolute values of differences between pixel values of corresponding pixels of element images instead of a normalized correlation value and, if the sum of the absolute values of the differences between the pixel values is equal to or larger than a certain threshold, determine that the element images do not match.

If determining that a target HTML element is a dynamic element based on either an attribute relating to display or element images, the dynamic area identification unit 14 may omit a process for determining whether the target HTML element is a dynamic element based on the other of the attribute relating to display or the element images. In this case, the amount of processing is reduced.

The dynamic area identification unit 14 notifies the comparison unit 15 of a dynamic area identified based on either an attribute relating to display or element images and an identification number of a dynamic element displayed in the dynamic area.

The comparison unit 15 identifies HTML elements whose displayed content is different between two browsers and areas in which the HTML elements are displayed by comparing element images of HTML elements. At this time, the comparison unit 15 does not compare element images of a dynamic element between the browsers. The comparison unit 15 may refer to an identification number of a dynamic element transmitted from the dynamic area identification unit 14 and exclude element images of the dynamic element corresponding to the identification number from the comparison. As a result, the comparison unit 15 can appropriately determine whether there are differences between browsers in web content to be verified.

The comparison unit 15 may refer to identification numbers of extracted HTML elements and determine that HTML elements to which the same identification number is assigned in two browsers as the same HTML element. The comparison unit 15 may then compare element images of the HTML element corresponding to the same identification number in the two browsers. At this time, the comparison unit 15 may calculate a normalized correlation value of the element images. If the normalized correlation value is equal to or smaller than a certain threshold, the comparison unit 15 determines that the element images are different from each other, and identifies the HTML element corresponding to the element images as an HTML element whose displayed content is different between the two browsers. The comparison unit 15 determines areas of the two browsers corresponding to the element images of the identified HTML element as areas in which the HTML element whose displayed content is different is displayed.

If the normalized correlation value is larger than the certain threshold, on the other hand, the comparison unit 15 may determine that the element images match. The comparison unit 15 may calculate the sum of absolute values of differences between pixel values of corresponding pixels of element images instead of a normalized correlation value and, if the sum of the absolute values of the differences between the pixel values is equal to or larger than a certain threshold, determine that the element images are different from each other.

The comparison unit 15 causes the user interface 3 to display a result of comparison indicating whether each HTML element subjected to the comparison matches. Alternatively, the comparison unit 15 may cause the user interface 3 to display information indicating only HTML elements that are included in web content to be verified and whose displayed content does not match between browsers. The comparison unit 15 may also cause the user interface 3 to display element images of the HTML elements whose displayed content does not match between the browsers.

Figure 4:
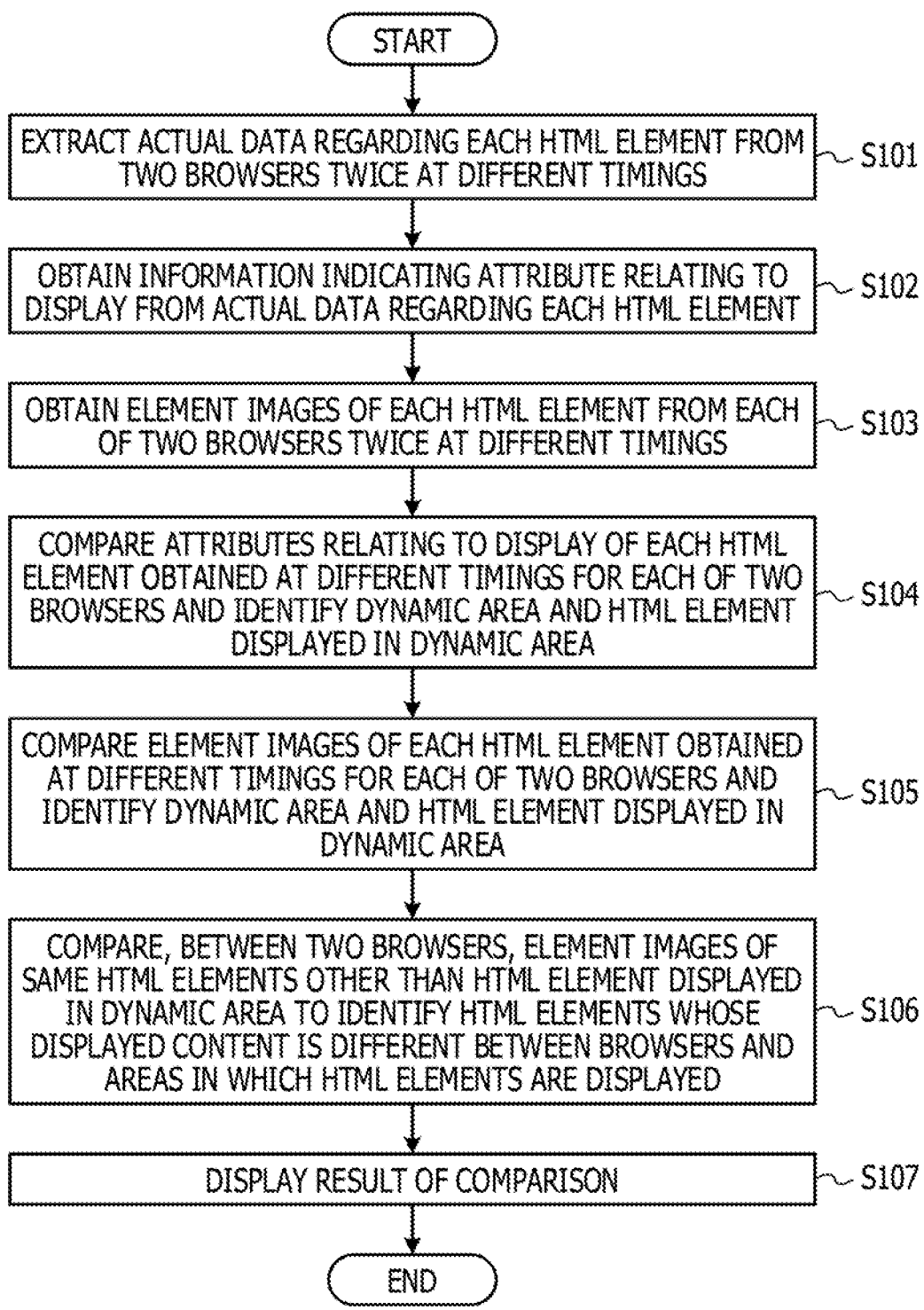
FIG. 4 is an operation flowchart of the process for verifying content.

FIG. 4 is an operation flowchart of the process for verifying content performed by the processor 6.

The element extraction unit 11 extracts actual data regarding each HTML element included in web content to be verified from two browsers at least twice at different timings (S101).

The attribute obtaining unit 12 obtains information indicating an attribute relating to display of each of the extracted HTML elements from the actual data regarding the HTML element (S102). As a result, the attributes relating to display of each HTML element at the different timings is obtained.

The element image obtaining unit 13 obtains element images of each HTML element from each of the two browsers at least twice at different timings (S103).

The dynamic area identification unit 14 compares the attributes relating to display of each HTML element obtained at different timings for each of the two browsers. As a result, the dynamic area identification unit 14 identifies a dynamic area, in which displayed content changes over time, and an HTML element displayed in the dynamic area (S104).

The dynamic area identification unit 14 also compares the element images of each HTML element obtained at different timings for each of the two browsers. As a result, the dynamic area identification unit 14 identifies a dynamic area, in which displayed content changes over time, and an HTML element displayed in the dynamic area (S105).

The comparison unit 15 compares, between the two browsers, the element images of the same HTML elements other than the HTML element displayed in the dynamic area to identify HTML elements whose displayed content is different between the browsers and areas of the browsers in which the HTML elements are displayed (S106). The comparison unit 15 then causes the user interface 3 to display a result of the comparison (S107).

The processor 6 ends the process for verifying content. The processor 6 may switch the order of S103 and S104.

As described above, the content verification apparatus checks not only whether an element image of each HTML element included in web content to be verified has changed over time but also whether an attribute relating to display of the HTML element has changed over time. The content verification apparatus, therefore, can accurately identify an HTML element displayed in a dynamic area. In addition, the content verification apparatus compares, between two browsers, element images of the same HTML elements other than the HTML element displayed in the dynamic area to identify HTML elements whose displayed content is different between the browsers and areas in which the HTML elements are displayed. The content verification apparatus can thus improve the accuracy of comparing displayed web content between different browsers.

If three or more attributes relating to display of a target HTML element have been obtained from each browser, the dynamic area identification unit 14 may select two of the attributes relating to display. The dynamic area identification unit 14 may then determine, as described above, whether the target HTML element is a dynamic element based on whether the selected two attributes relating to display match.

Similarly, if three or more element images of a target HTML element have been obtained from each browser, the dynamic area identification unit 14 may select two of the element images. The dynamic area identification unit 14 may then determine, as described above, whether the target HTML element is a dynamic element based on whether the selected two element images match.

According to a modification, the content verification apparatus may, before identifying a dynamic area, compare element images of the same HTML elements between two browsers displaying web content to be verified. The content verification apparatus may then identify HTML elements whose displayed content does not match (hereinafter referred to as "inconsistent elements") and areas in which the HTML elements are displayed. The content verification apparatus may then make the determination as to a dynamic element only for the inconsistent elements among the HTML elements included in the web content to be verified.

In this case, first, the element extraction unit 11 extracts actual data regarding each HTML element from the two browsers. The attribute obtaining unit 12 obtains information indicating an attribute relating to display of each HTML element from the actual data regarding the HTML element and saves the information to the memory 4. The element image obtaining unit 13 obtains element images of each HTML element from the two browsers. The comparison unit 15 then compares the element images of the same HTML elements to identify HTML elements whose displayed content is different between the two browsers (that is, inconsistent elements).

Thereafter, the element extraction unit 11 again extracts actual data regarding each inconsistent element from the two browsers. The attribute obtaining unit 12 again obtains information indicating an attribute relating to display of each of the inconsistent elements extracted after the identification from the two browsers. The element image obtaining unit 13 again obtains element images of each inconsistent element from the two browsers. The dynamic area identification unit 14 then identifies an inconsistent element that is a dynamic element and a dynamic area based on comparison of the attributes relating to display of the inconsistent elements before and after the identification and comparison of the element images of the inconsistent elements before and after the identification. The comparison unit 15 then selects the inconsistent HTML elements other than the dynamic element and determines areas in which the selected inconsistent HTML elements are displayed as areas in which displayed content is different between the two browsers. The comparison unit 15 causes the user interface 3 to display a result of the comparison indicating that the displayed content of the selected HTML elements is different between the browsers.

Figure 5:
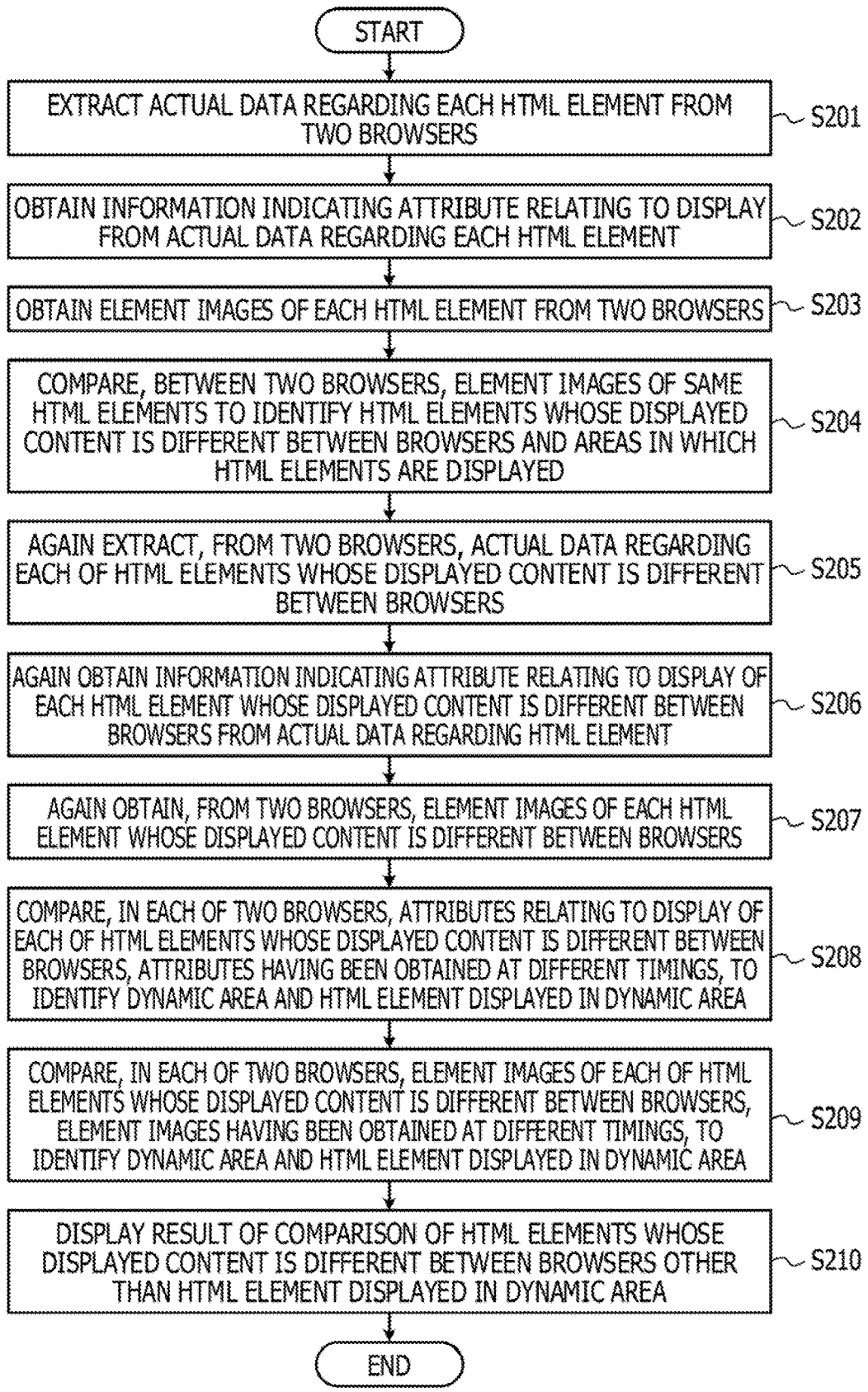
FIG. 5 is an operation flowchart of a process for verifying content according to a modification.

FIG. 5 is an operation flowchart of the process for verifying content performed by the processor 6 according to the modification.

The element extraction unit 11 extracts actual data regarding each HTML element included in web content to be verified from two browsers (S201).

The attribute obtaining unit 12 obtains information indicating an attribute relating to display of each of the extracted HTML elements from the actual data regarding the HTML element (S202).

The element image obtaining unit 13 obtains element images of each HTML element from the two browsers (S203).

The comparison unit 15 compares, between the two browsers, the element images of the same HTML elements to identify HTML elements whose displayed content is different between the browsers and areas of the browsers in which the HTML elements are displayed (S204).

The element extraction unit 11 again extracts, from the two browsers, actual data regarding each of the HTML elements whose displayed content is different between the browsers (S205). The attribute obtaining unit 12 again obtains information indicating an attribute relating to display of each of the extracted HTML elements from the actual data regarding the HTML element (S206). The element image obtaining unit 13 again obtains, from the two browsers, element images of each of the HTML elements whose displayed content is different between the browsers (S207).

The dynamic area identification unit 14 compares, in each of the two browsers, the attributes relating to display of each of the HTML elements whose displayed content is different between the browsers, the attributes having been obtained at different timings. The dynamic area identification unit 14 thus identifies an HTML element displayed in a dynamic area, in which displayed content changes over time (S208).

The dynamic area identification unit 14 then compares, in each of the two browsers, element images of each of the HTML elements whose displayed content is different between the browsers, the element images having been obtained at different timings, to identify an HTML element displayed in a dynamic area (S209).

The comparison unit 15 selects the HTML elements whose displayed content is different between the browsers other than the HTML element displayed in the dynamic area and causes the user interface 3 to display a result of the comparison of the selected HTML elements (S210). The processor 6 ends the process for verifying content.

According to the modification, time intervals at which an attribute relating to display of each HTML element whose displayed content is different between browsers is obtained and time intervals at which element images of each HTML element are obtained can be increased. As illustrated in FIG. 1B, therefore, the content verification apparatus can accurately identify an HTML element whose displayed content changes at certain time intervals as an HTML element displayed in a dynamic area. Furthermore, according to the modification, the content verification apparatus compares element images of each HTML element between browsers after a timing at which an attribute relating to display and element images are obtained for the first time but before a timing at which an attribute relating to display and element images are obtained again. The content verification apparatus, therefore, can suppress an increase in time taken to complete the process for verifying content even if a time interval between the timing at which an attribute relating to display and element images are obtained for the first time and a timing at which an attribute relating to display and element images are obtained again becomes longer than in the embodiment.

Furthermore, a computer program for causing a computer to achieve the functions of the components of the processor of the content verification apparatus according to the above embodiment or modification may be stored in a computer-readable storage medium and provided. The computer-readable storage medium may be, for example, a magnetic storage medium, an optical storage medium, or a semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium having stored therein a program that causes a computer to execute a process comprising:
    identifying, among a plurality of elements included in a content to be verified and displayed in two browsers that display the content respectively, a dynamic element whose attribute relating to display changes over time or whose element image changes over time in at least one of the two browsers;
    identifying an area in which displayed content is different between the two browsers by comparing element images of the plurality of elements other than the dynamic element between the two browsers;
    obtaining the attribute relating to display of each of the plurality of elements from each of the two browsers;
    obtaining the element image of each of the plurality of elements from each of the two browsers;
    identifying, among the plurality of elements, inconsistent elements whose displayed content is different between the two browsers by comparing the element images of the plurality of elements obtained from each of the two browsers; and
    obtaining the attributes relating to display of the inconsistent elements from each of the two browsers and the element images of the inconsistent elements from each of the two browsers,
    wherein the identifying a dynamic element includes
        identifying, as the dynamic element, an inconsistent element whose attribute relating to display and whose attribute relating to display obtained again are different from each other or an inconsistent element whose element image and whose element image obtained again are different from each other in at least one of the two browsers, and
    wherein the identifying an area in which displayed content is different between the two browsers includes
        identifying areas in which the inconsistent elements other than the dynamic element are displayed as areas in which displayed content is different between the two browsers.

2. The non-transitory computer-readable storage medium according to claim 1, further comprising:
    obtaining, from each of the two browsers, an attribute relating to display of each of the plurality of elements at a first time point; and
    obtaining, from each of the two browsers, the attribute relating to display of each of the plurality of elements at a second time point, which is different from the first time point,
    wherein the identifying a dynamic element includes
        identifying, among the plurality of elements in at least one of the two browsers, an element whose attribute relating to display at the first time point and whose attribute relating to display at the second time point are different from each other as the dynamic element.

3. The non-transitory computer-readable storage medium according to claim 1,
    wherein the obtaining the element image includes obtaining a screenshot of a display screen of a user interface with one of the two browsers displayed.

4. The non-transitory computer-readable storage medium according to claim 3,
    wherein the obtaining a screenshot includes using a function for obtaining the screenshot.

5. The non-transitory computer-readable storage medium according to claim 1,
    wherein the attribute relating to display includes at least information indicating a position of an area in which the element is displayed, information for displaying or hiding the element, information indicating transparency of the element, or information indicating whether the element is a moving image.

6. A content verification apparatus comprising:
    a memory; and
    a processor coupled to the memory and configured to:
        identify, among a plurality of elements included in a content to be verified and displayed in two browsers that display the content respectively, a dynamic element whose attribute relating to display changes over time or whose element image changes over time in at least one of the two browsers, identify an area in which displayed content is different between the two browsers by comparing element images of the plurality of elements other than the dynamic element between the two browsers, obtain the attribute relating to display of each of the plurality of elements from each of the two browsers, obtain the element image of each of the plurality of elements from each of the two browsers, identify, among the plurality of elements, inconsistent elements whose displayed content is different between the two browsers by comparing the element images of the plurality of elements obtained from each of the two browsers, obtain the attributes relating to display of the inconsistent elements from each of the two browsers and the element images of the inconsistent elements from each of the two browsers, identify, as the dynamic element, an inconsistent element whose attribute relating to display and whose attribute relating to display obtained again are different from each other or an inconsistent element whose element image and whose element image obtained again are different from each other in at least one of the two browsers, and identify areas in which the inconsistent elements other than the dynamic element are displayed as areas in which displayed content is different between the two browsers.

7. The content verification apparatus according to claim 6, wherein the processor is configured to:

obtain, from each of the two browsers, an attribute relating to display of each of the plurality of elements at a first time point; and obtain, from each of the two browsers, the attribute relating to display of each of the plurality of elements at a second time point, which is different from the first time point, and identify, among the plurality of elements in at least one of the two browsers, an element whose attribute relating to display at the first time point and whose attribute relating to display at the second time point are different from each other as the dynamic element.

8. The content verification apparatus according to claim 6, wherein the processor is configured to obtain a screenshot of a display screen of a user interface with one of the two browsers displayed.

9. The content verification apparatus according to claim 8, wherein the processor is configured to use a function for obtaining the screenshot.

10. The content verification apparatus according to claim 6, wherein the attribute relating to display includes at least information indicating a position of an area in which the element is displayed, information for displaying or hiding the element, information indicating transparency of the element, or information indicating whether the element is a moving image.

11. A method for verifying content performed by a processor of a content verification apparatus, the method comprising:

identifying, among a plurality of elements included in a content to be verified and displayed in two browsers that display the content respectively, a dynamic element whose attribute relating to display changes over time or whose element image changes over time in at least one of the two browsers;

identifying an area in which displayed content is different between the two browsers by comparing element images of the plurality of elements other than the dynamic element between the two browsers;

obtaining the attribute relating to display of each of the plurality of elements from each of the two browsers;

obtaining the element image of each of the plurality of elements from each of the two browsers;

identifying, among the plurality of elements, inconsistent elements whose displayed content is different between the two browsers by comparing the element images of the plurality of elements obtained from each of the two browsers; and obtaining the attributes relating to display of the inconsistent elements from each of the two browsers and the element images of the inconsistent elements from each of the two browsers, wherein the identifying a dynamic element includes
identifying, as the dynamic element, an inconsistent element whose attribute relating to display and whose attribute relating to display obtained again are different from each other or an inconsistent element whose element image and whose element image obtained again are different from each other in at least one of the two browsers, and wherein the identifying an area in which displayed content is different between the two browsers includes
identifying areas in which the inconsistent elements other than the dynamic element are displayed as areas in which displayed content is different between the two browsers.

* * * * *